(12) United States Patent
Blackhurst et al.

(10) Patent No.: US 9,954,962 B2
(45) Date of Patent: Apr. 24, 2018

(54) SERVING ANONYMOUS COOKIES ASSOCIATED WITH PURCHASING ANALYTICS

(71) Applicant: BANK OF AMERICA CORPORATION, Charlotte, NC (US)

(72) Inventors: Jason P. Blackhurst, Charlotte, NC (US); Frederick A. Shahda, Charlotte, NC (US); Robert L. Abbott, Charlotte, NC (US); Alfred Hamilton, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 491 days.

(21) Appl. No.: 14/616,477

(22) Filed: Feb. 6, 2015

(65) Prior Publication Data
US 2016/0234322 A1 Aug. 11, 2016

(51) Int. Cl.
*G06F 15/173* (2006.01)
*H04L 29/08* (2006.01)
*G06Q 30/02* (2012.01)
*H04L 29/06* (2006.01)

(52) U.S. Cl.
CPC ......... *H04L 67/22* (2013.01); *G06Q 30/0201* (2013.01); *G06Q 30/0251* (2013.01); *H04L 63/0421* (2013.01); *H04L 67/02* (2013.01); *H04L 67/20* (2013.01)

(58) Field of Classification Search
USPC ........................ 709/224; 705/35, 14.1, 14.45
See application file for complete search history.

(56) References Cited

U.S. PATENT DOCUMENTS

| 7,457,778 | B2 | 11/2008 | Li et al. |
| 7,539,644 | B2 | 5/2009 | Hu et al. |
| 7,904,520 | B2 | 3/2011 | Neal et al. |
| 8,234,164 | B2 | 7/2012 | Walker et al. |
| 8,234,259 | B2 | 7/2012 | Brooks et al. |
| 8,239,256 | B2 | 8/2012 | Heiser, II et al. |
| 8,346,609 | B2 | 1/2013 | Lee et al. |
| 8,355,959 | B2 | 1/2013 | Bui |
| 8,442,894 | B2 | 5/2013 | Blackhurst et al. |
| 8,543,451 | B2 | 9/2013 | Walker et al. |

(Continued)

*Primary Examiner* — Tammy Nguyen
(74) *Attorney, Agent, or Firm* — Michael A. Springs; Moore & Van Allen PLLC; James C. Edwards

(57) ABSTRACT

Anonymously providing purchasing analytics associated with customer to a website while the customer is accessing the website. Specifically, a financial institution, having access to a customer's transactional data, can analyze the data to determine analytical purchasing data. Once the customer authenticates themselves at a financial institution website, a networked application or the like, an anonymous cookie that is configured to identify the analytical purchasing data is generated and stored in the web browser cache. In response to the customer using the device to access a website that displays advertisements, the anonymous cookie is retrieved from the web browser cache and the analytical purchasing data is provided to the website. In specific embodiments of the invention, the website uses the analytical purchasing data of the customer to determine which of the plurality of advertisements are to be displayed to the customer while they visit the website.

16 Claims, 4 Drawing Sheets

(56) References Cited

U.S. PATENT DOCUMENTS

| | | |
|---|---|---|
| 8,583,749 B2 | 11/2013 | Neal et al. |
| 8,595,058 B2 | 11/2013 | Fordyce, III et al. |
| 8,626,665 B2 | 1/2014 | Bui |
| 8,650,265 B2 | 2/2014 | Broder et al. |
| 8,706,632 B2 | 4/2014 | Walker et al. |
| 8,744,906 B2 | 6/2014 | Fordyce, III et al. |
| 8,799,458 B2 | 8/2014 | Barber |
| 8,843,391 B2 | 9/2014 | Fordyce, III et al. |
| 8,874,465 B2* | 10/2014 | Heiser, III ........ G06F 17/30867 705/14.1 |
| 8,930,265 B2* | 1/2015 | Blackhurst ......... G06Q 30/0255 705/35 |
| 2011/0047072 A1 | 2/2011 | Ciurea |
| 2011/0125565 A1* | 5/2011 | MacIlwaine ........... G06Q 30/02 705/14.17 |
| 2011/0191160 A1 | 8/2011 | Blackhurst et al. |
| 2012/0310732 A1* | 12/2012 | Heiser, II ............... G06Q 30/02 705/14.45 |
| 2013/0006766 A1* | 1/2013 | Dedeoglu ............. G06Q 30/02 705/14.53 |
| 2013/0018713 A1 | 1/2013 | Kumar et al. |
| 2014/0358682 A1* | 12/2014 | Blackhurst ............. G06Q 20/10 705/14.53 |
| 2015/0019326 A1* | 1/2015 | Russell .............. G06Q 30/0255 705/14.45 |
| 2016/0232564 A1* | 8/2016 | Blackhurst ......... G06Q 30/0255 |
| 2016/0232590 A1* | 8/2016 | Abbott .................... H04L 67/20 |
| 2016/0234322 A1* | 8/2016 | Blackhurst ............. H04L 67/22 |

\* cited by examiner

SERVING ANONYMOUS COOKIES ASSOCIATED WITH PURCHASING ANALYTICS

REFERENCE TO CO-PENDING APPLICATION FOR PATENT

The present application for patent is related to co-pending United States Patent Applications entitled, "Serving Targeted Electronic Advertisements Based on Anonymous Cookies that Identify Spending Trends", inventors Blackhurst et al., having 14/616,492, and "Non-Public Cookie Associated with Anonymous Purchase Data", inventors Abbott, et al., having 14/616,485, filed concurrently herewith, assigned to the assignee hereof, and expressly incorporated by reference herein.

FIELD

In general, embodiments of the invention relate to computing and, more particularly, serving anonymous cookies that identify a customer's purchasing analytics without identifying the customer.

BACKGROUND

Currently, targeted electronic advertising is implemented through the use of browser cookies—which are a small text files sent to your web browser by a website that you visit. Conventionally, cookies contain information about your visit that you may want the site to remember, like your preferred language and other settings. The web browser stores this data and retries the cookie the next time you visit the site to make the next trip easier and more personalized.

In addition, cookies are used in online advertising for the purpose remembering your interests (i.e., what webpages you've visited) and subsequently showing you related (i.e., targeted) advertisements as you visit other locations throughout the Internet. For example, a user/customer may visit an electronic-commerce (e-commerce) website that sells a product the user is interested in purchasing and the user may browse various web pages on the website, each web page associated with a different product. The e-commerce website may be configured to generate and drop cookies in the user/customer's web browser that identify the web page(s) visited and the content/product associated with those web pages. When the user/customer leaves the e-commerce website and browses other websites on the Internet that have advertising, and more, specifically advertising associated with the previously visited electronic commerce website, the other website may retrieve the cookies and use the information stored therein to provide the user/customer with targeted advertisements. Typically, this means that the user is presented with advertisements for the product(s) that were on the webpages previously visited by the user/customer (i.e., the products that the user/customer showed an interest in).

However, such targeted advertising may be highly ineffective because it does not take into account the fact that in many instances the user/customer has already purchased the product prior to being presented the advertisement, either at another e-commerce website, at a physical retail location (i.e., brick and mortar location) or, in some instances, at the same e-commerce website which generated and dropped the cookies (i.e., the same e-commerce retailer that is providing the user/customer the targeted advertising). In addition, such targeted advertising is limited, in that it is solely based off of previously visited websites and does not take into account any other information or factors that may be relevant to providing more effective targeted advertisement (i.e., advertising that will result in the user/customer responding to the advertising and purchasing the product or service associated with the advertisement).

Therefore, a need exists to develop systems, apparatus, computer program products, methods and the like that provide for serving a website or the website advertiser more robust information about customer without actually identifying the customer. In this regard, the desired systems, apparatus, computer program products, methods and the like should provide for a website or an advertiser advertising on the website to be provided information other than what previous websites or specific webpages within a website a customer has previously visited. Moreover, the desired systems, apparatus, computer program products, methods and the like should provide such relevant robust purchasing-related information to the merchant or advertiser while the customer is concurrently visiting the merchant's website or the site at which the advertiser advertises without divulging the identity of the customer.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for anonymously providing purchasing analytics associated with customer to a website while the customer is accessing the website. Specifically, a financial institution, having access to a customer's transactional data, can analyze the data to determine analytical purchasing data associated with the customer.

Once the customer authenticates (e.g., logs-in or the like) themselves at a financial institution website (e.g., online banking), a networked application (e.g., mobile banking) or any other website or application affiliated with the financial institution, an anonymous cookie (i.e., text file) is generated that is configured to identify the analytical purchasing data without identifying the customer. In specific embodiments of the invention, the anonymous cookie includes a unique identifier associated with the customer and, in some embodiments, the purchasing analytic data.

In response to the customer using the device (on which the anonymous cookie is stored) to access a website that displays advertisements, the anonymous cookie is retrieved from the web browser cache, and the analytical purchasing data is provided to the website. In specific embodiments of the invention, in which the anonymous cookie includes a unique identifier, the unique identifier prompt a call-back to a financial institution server, which retrieves data related to the analytical purchasing data and communicates the same to the website. In specific embodiments of the invention, the website may use the analytical purchasing data to determine which of the plurality of advertisements (including offers, coupons and the like) available to the advertiser are to be displayed to the customer while they visit the website.

An apparatus for anonymously providing purchasing analytics associated with customer to a website while the customer is accessing the website defines first embodiments of the invention. The apparatus includes a computing platform having a memory and at least one processor in communication with the memory. The apparatus further includes a purchasing analytics application that is stored in the memory and executable by one or more of the processors. The purchasing analytics application is configured to access one or more financial institution transaction databases that store transaction records associated with a customer of the financial institution, and determine, based on the transaction records, analytical purchasing data associated with the customer. The apparatus further includes a cookie initiator application that is stored in the memory and is executable by one or more of processors. The cookie initiator application is configured to, in response to the customer authenticating themselves at a first website or mobile application as a customer of the financial institution, initiate generation of an anonymous cookie that is configured to identify the analytical purchasing data and is stored in web browser cache of a computing device from which the customer has accessed the first website or the mobile application. In response to the customer using the device to access a second website, the anonymous cookie is retrieved from the web browser cache and the analytical purchasing data is provided to the second website.

In specific embodiments of the apparatus, the purchasing analytics application is further configured to determine, based on the transaction data, at least one of date purchasing trends or time purchasing trends associated with the customer, and the cookie initiator application is further configured to initiate generation of the anonymous cookie that is configured to identify the date purchasing trends and the time purchasing trends associated with the customer. In such embodiments of the apparatus, the date and time purchasing trends are further defined as being one of product or service specific, type of product or service specific, merchant specific, or type of merchant specific.

In other specific embodiments of the apparatus, the purchasing analytics application is further configured to determine, based on the transaction data, at least one of an amount or a percentage purchased electronically and purchased at a physical location associated with the customer, and the cookie initiator application is further configured to initiate generation of the anonymous cookie that is configured to identify the amount or a percentage purchased electronically and purchased at a physical location. In such embodiments of the apparatus, the amount and the percentage are further defined as being one of product or service specific, type of product or service specific, merchant specific, or type of merchant specific.

In still further specific embodiments of the apparatus, the purchasing analytics application is further configured to determine, based on the transaction data, at least one of an amount or a percentage purchased at a specified merchant in comparison to at least one of an overall purchase amount for the customer or a purchase amount for a merchant type by the customer, and the cookie initiator application is further configured to initiate generation of the anonymous cookie that is configured to identify the amount or the percentage purchased at the specified merchant in comparison to at least one of the overall purchase amount of the customer or the purchase amount for a merchant type by the customer, In still further specific embodiments of the invention, the cookie initiator application is further configured to initiate generation of the anonymous cookie that includes a unique identifier associated with one or more of the customer and, in some embodiments, the analytical purchasing data. In such embodiments of the apparatus, in response to the customer using the computing device to access the second website and retrieve the anonymous cookie from the web browser cache, the unique identifier prompts a call-back to a financial institution server which, in response, retrieves the analytical purchasing data, and communicates the analytical purchasing data to the second website. In such embodiments of the apparatus, in response to the customer using the device to access the second website, at least one of (i) the anonymous cookie being retrieved from the web browser cache, (ii) the call-back to the financial institution server or (iii) retrieving the analytical purchasing data and communicating the analytical purchasing date to the second website, is based on the website being affiliated with the financial institution.

Moreover, in further specific embodiments of the apparatus, the second website uses the analytical purchasing data to determine one or more advertisements to currently display to the customer while accessing the second website. While in other specific embodiments of the apparatus, the second website compiles the analytical purchasing data and data associated with the website session of the customer.

A system for anonymously providing purchasing analytics associated with customer to a website while the customer is accessing the website defines second embodiments of the invention. The system includes a user computing device having a first memory and at least one first processor in communication with the memory. The system further includes a first computing platform including a second memory and at least one second processor in communication with the second memory. Additionally, the system includes a purchasing analytics application that is stored in the second memory, executable by one or more of the second processors and configured to access one or more financial institution transaction databases that store transaction records associated with a customer of the financial institution, and determine, based on the transaction records, analytical purchasing data associated with the customer. In addition, the system includes a web browser application that is stored in the first memory and executable by one or more of first processors. The web browser application is configured to, in response to the customer authenticating themselves at a first website or mobile application as a customer of the financial institution, generate an anonymous cookie that is configured to identify the analytical purchasing data, and store the anonymous cookie in a web browser cache. In response to the customer using the computing device to access a second website, the anonymous cookie is retrieved from the web browser cache and the analytical purchasing data is provided to the website.

In specific embodiments of the system the purchasing analytics application is further configured to determine, based on the transaction data, at least one of (1) a date purchasing trends, (2) time purchasing trends or (3) an amount or a percentage purchased electronically and purchased at a physical location, associated with the customer, and the web browser application is further configured to initiate generation of the anonymous cookie that is configured to identify the date purchasing trends and the time purchasing trends and the amount or the percentage purchased electronically and purchased at the physical location associated with the customer.

In additional embodiments of the system the purchasing analytics application is further configured to determine, based on the transaction data, at least one of (1) the date purchasing trends, (2) the time purchasing trends or (3) the amount or the percentage purchased electronically and purchased at a physical location associated with the customer, and wherein the date and time purchasing trends and the amount or the percentage purchased electronically and purchased at a physical location are further defined as being one of product or service specific, type of product or service specific, merchant specific, or type of merchant specific.

In further embodiments of the system, the web browser application is further configured to generate the anonymous cookie that includes a unique identifier associated with one or more of the customer and, in some embodiments, the analytical purchasing data. In such embodiments of the system, in response to the customer using the computing device to access the second website and retrieving the anonymous cookie from the web browser cache, the unique identifier in the anonymous cookie prompts a call-back to a financial institution server which, in response, retrieves the analytical purchasing data, and communicates the analytical purchasing data to the second website. In further related embodiments of the system, in response to the customer using the device to access the second website, at least one of (i) the anonymous cookie being retrieved from the web browser cache, (ii) the call-back to the financial institution server or (iii) retrieving the analytical purchasing data and communicating the analytical purchasing date to the second website, is based on the website being affiliated with the financial institution.

Moreover, in further specific embodiments the system includes a second computing platform including a third memory and at least one third processor in communication with the third processor. The embodiment of the system further includes a targeted advertisement serving application stored in the third memory that is executable by the third processor and configured to, in response to (i) the customer using the computing device to access a second website, (ii) retrieving the anonymous cookie from the web browser cache and (iii) providing the analytical purchasing data to the website, determine, based on the analytical purchasing data, which of one or more advertisements to currently display to the customer while accessing the second website.

A computer program product including a non-transitory computer-readable medium defines third embodiments of the invention. The computer-readable medium includes a first set of codes for causing a computer to access one or more financial institution transaction databases storing transaction records associated with a customer of the financial institution to determine, based on the transaction records, analytical purchasing data associated with the customer. The computer-readable medium additionally includes a second set of codes for causing a computer to, in response to the customer identifying themselves at a first website or mobile application as a customer of the financial institution, initiate generation of an anonymous cookie that is configured to identify the analytics purchasing data and is stored in a web browser cache on a computing device from which the customer has accessed the first website or the mobile application. In addition, the computer-readable medium includes a third set of codes for causing a computer to, in response to (i) the customer using the computing device to access a second website and (ii) retrieving the anonymous cookie from the web browser cache, provide the one of the analytical purchasing data to the website.

Thus, systems, apparatus, methods, and computer program products herein described in detail below provide for anonymously providing purchasing analytics associated with customer to a website while the customer is accessing the website. Specifically, a financial institution, having access to a customer's transactional data, can analyze the data to determine analytical purchasing data. Once the customer authenticates (e.g., logs-in or the like) themselves at a financial institution website (e.g., online banking), a networked application (e.g., mobile banking) or any other website or application affiliated with the financial institution, an anonymous cookie that is configured to identify the analytical purchasing data is generated and stored in the web browser cache. In response to the customer using the device to access a website that displays advertisements, the anonymous cookie is retrieved from the web browser cache and the analytical purchasing data is provided to the website. In specific embodiments of the invention, the website uses the analytical purchasing data of the customer to determine which of the plurality of advertisements are to be displayed to the customer while they visit the website.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
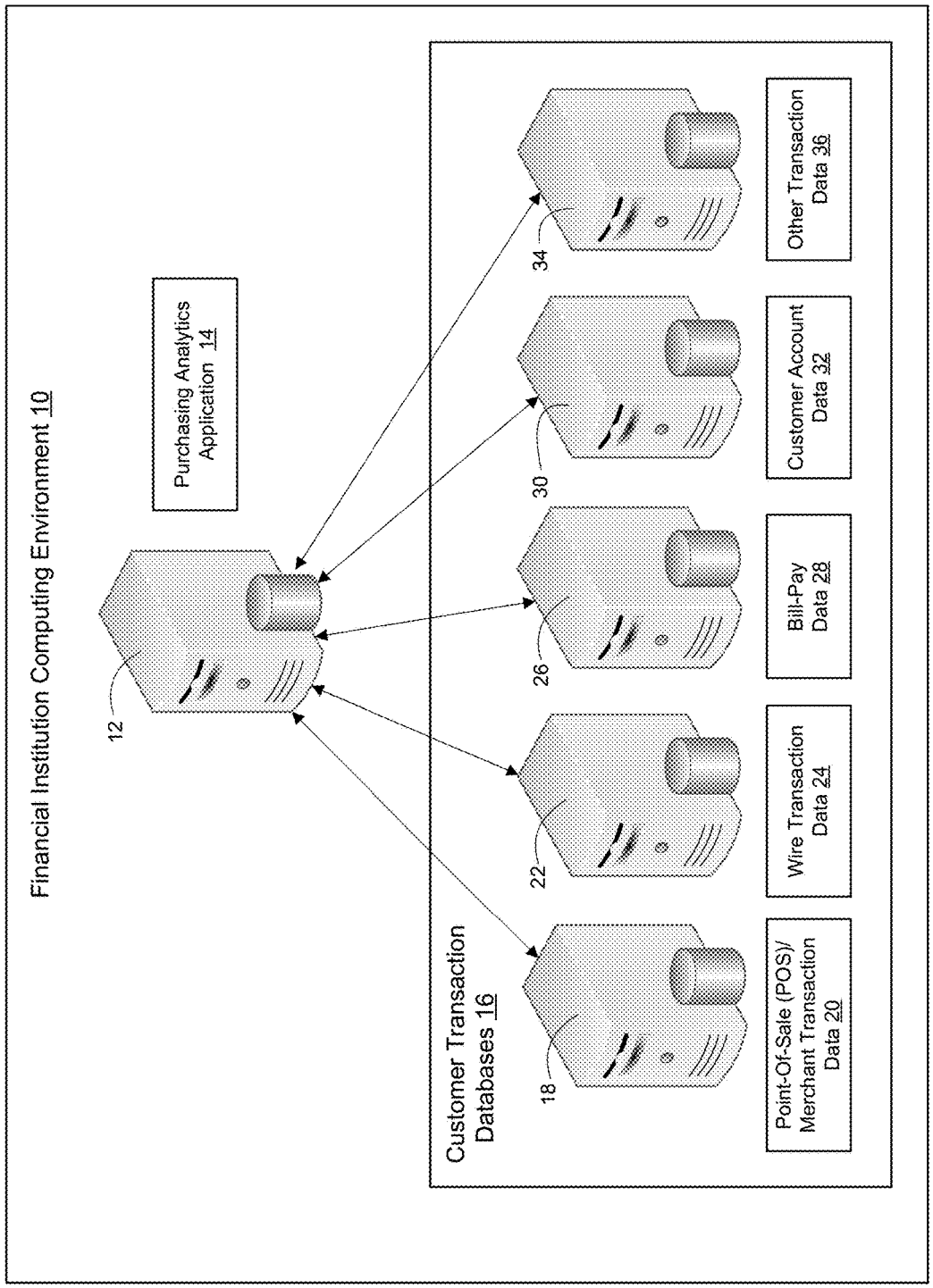
Figure 2:
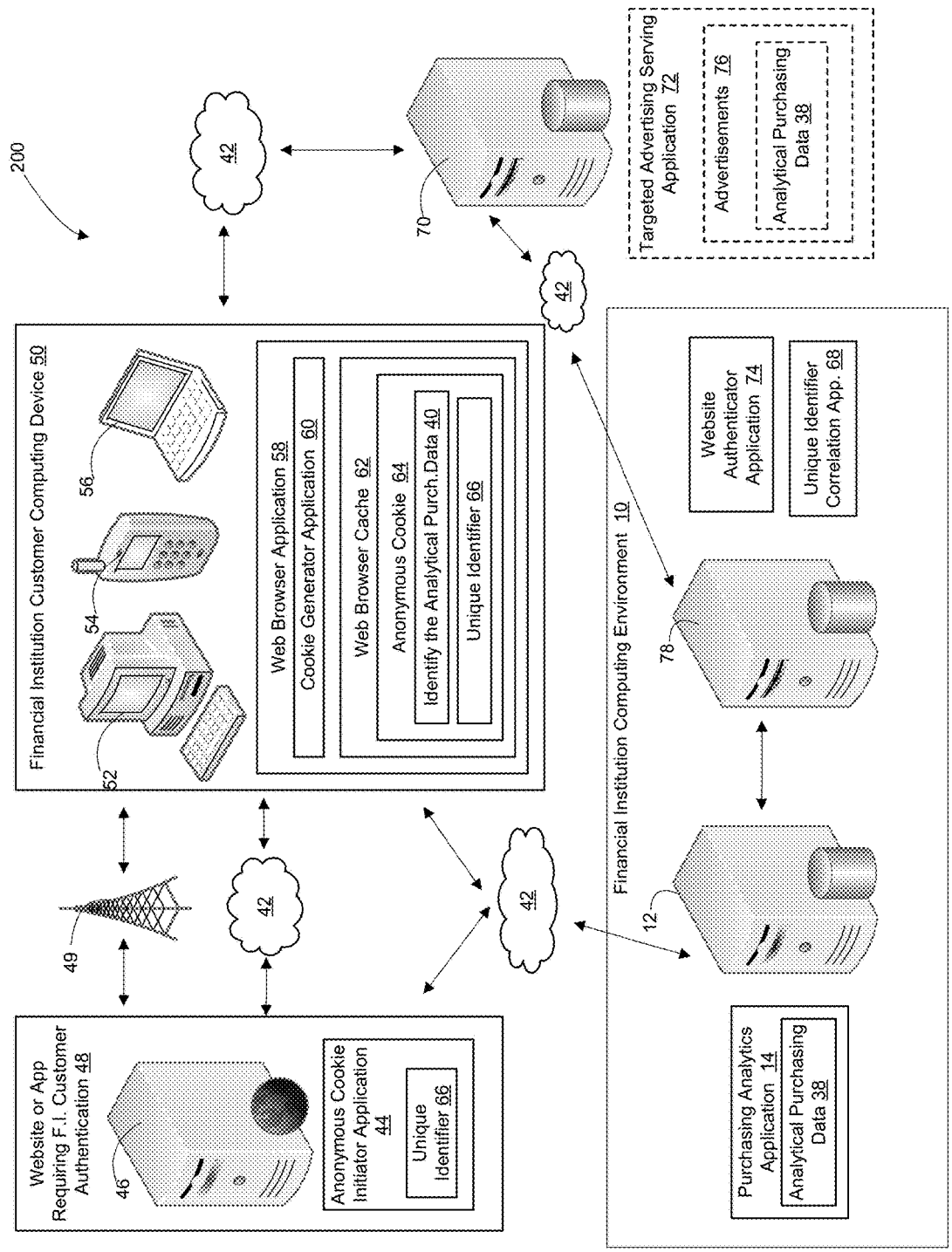
Figure 3:
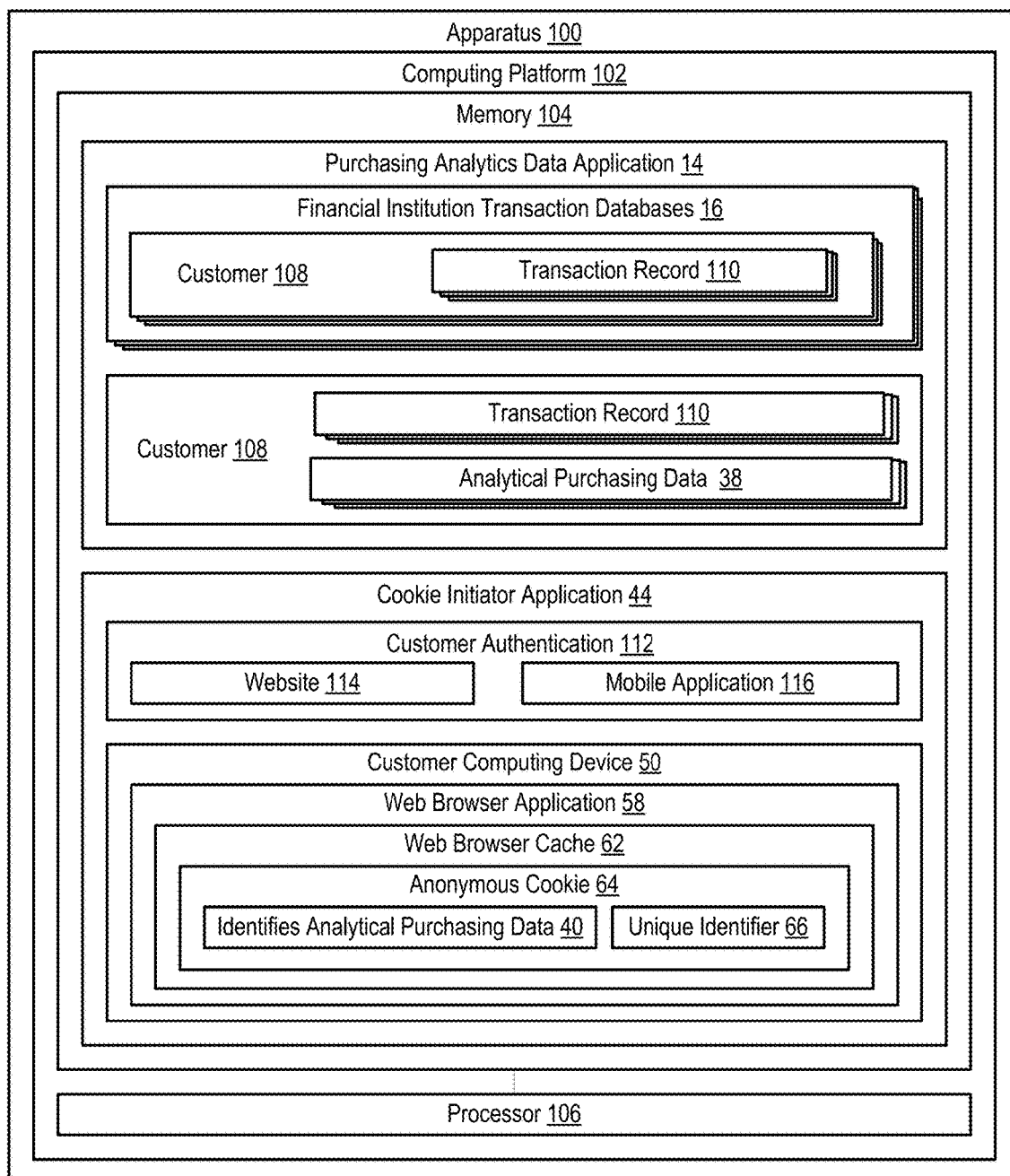
Figure 4:
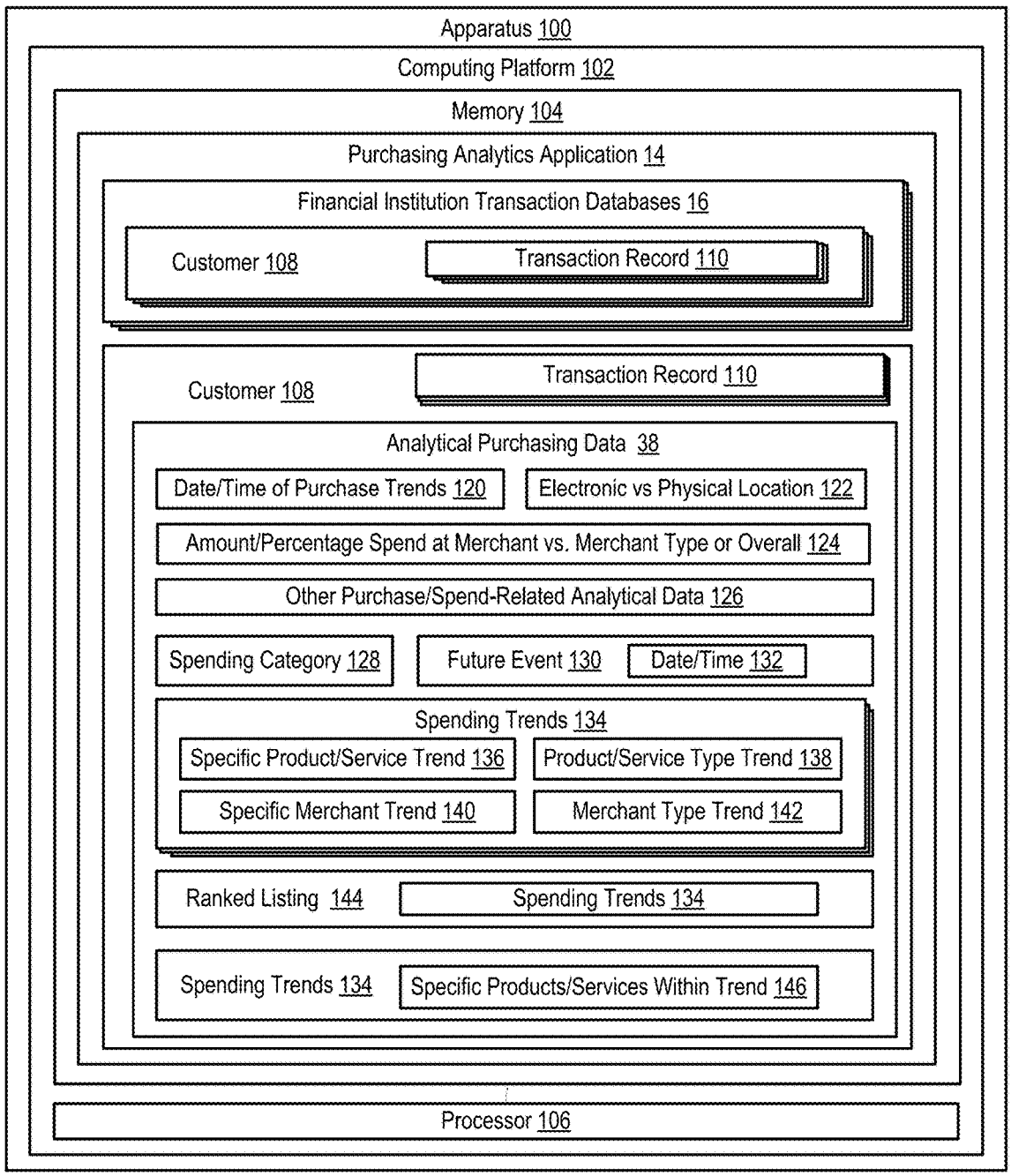

Having thus described embodiments of the invention in general terms, reference will now be made to the accompanying drawings, which are not necessarily drawn to scale, and wherein:

FIG. 1 provides a schematic diagram of a financial institution computing environment including a purchasing analytics application, in accordance with embodiments of the present invention;

FIG. 2 provides a system for anonymously providing purchasing analytics associated with customer to a website while the customer is accessing the website, in accordance with embodiments of the present invention;

FIG. 3 provides a block diagram of the apparatus configured for anonymously providing purchasing analytics associated with customer to a website while the customer is accessing the website, in accordance with embodiments of the present invention; and FIG. 4 provides a block diagram of an apparatus configured for determining analytical purchasing data, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for anonymously providing purchasing analytics associated with customer to a website while the customer is accessing the website. Specifically, a financial institution, having access to a customer's transactional data, can analyze the data to determine analytical purchasing data associated with the customer.

Once the customer authenticates (e.g., logs-in or the like) themselves at a financial institution website (e.g., online banking), a networked application (e.g., mobile banking) or any other website or application affiliated with the financial institution, an anonymous cookie (i.e., text file) is generated that is configured to identify the analytical purchasing data without identifying the customer. In specific embodiments of the invention, the anonymous cookie includes a unique identifier associated with the customer and, in some embodiments, the analytical purchasing data.

In response to the customer using the device (on which the anonymous cookie is stored) to access a website that displays advertisements, the anonymous cookie is retrieved from the web browser cache, and the analytical purchasing data is provided to the website. In specific embodiments of the invention, in which the anonymous cookie includes a unique identifier, the unique identifier prompt a call-back to a financial institution server, which retrieves data related to the analytical purchasing data and communicates the same to the website. In specific embodiments of the invention, the website may use the analytical purchasing data to determine which of the plurality of advertisements (including offers, coupons and the like) available to the advertiser are to be displayed to the customer while they visit the website.

Referring to FIG. 1, a schematic diagram is provided of a financial institution computing environment 10 configured to determine analytical purchasing data for financial institution customers, in accordance with embodiments of the present invention. The financial institution computing environment 10 includes network device 12, which may comprise one or more servers. Network device 12 executes purchasing analytics application 14 which is configured to access customer transaction databases 16 that store transaction records associated with financial institution customers and, based on the transaction records determine, analytical purchasing data for the customer. The customer transaction databases that are used to determine analytical purchasing data include any financial transaction data, such as point-of-sale (POS) merchant transaction database 18 storing POS merchant transaction data 20 (i.e., credit/debit transaction data), wire transaction database 22 storing wire transaction data 24, bill-pay database 26 storing bill-pay data 28, customer financial account database 32 storing customer financial account data 32 (e.g., checking account, savings account, credit account and the like deposits and remittance including debit transactions), and any other database 34 storing any other transaction data 36.

For example, the purchasing analytics application may be configured to determine analytical purchasing data that includes date/time purchase trends (e.g., times of the week, month or year that the customer prefers to make purchases and/or times within a day that the customer prefers to make purchases). Additionally, the purchasing analytics application 14 may be configured to determine analytical purchasing data that includes the customer's preference for electronic purchases versus physical (brick and mortar) purchases (e.g., percentage of overall spend at electronic merchants versus brick and mortar merchants and/or amount of spend at electronic merchants versus physical location merchants. Such date/time trends and or electronic purchase versus physical location purchase data may be product/ service specific, type of product/service specific (e.g., major appliances, groceries, and the like), merchant specific or type of merchant specific (e.g., big box store, home improvement store or the like).

In addition, the purchasing analytics application 14 may be configured to determine analytical purchasing data that includes the rate (amount over predetermined time) of purchase at a specific merchant or type of merchant and or the percentage spend a specific merchant in comparison to the customer's overall spend or spend within a merchant type category. Additionally, purchasing analytics application may be configured to determine any other analytical purchasing data that may be instrumental to a website in determining what advertisements to display or for any other purpose.

In other embodiments of the invention, the analytical purchasing data may include spend trends. A spending trend may indicate a customer's preference, over a predetermined time period, to purchase a specific product or service or a preference to purchase a product or service type (i.e., a category of products or services). Additionally, a spending trend may indicate a customer's preference, over a predetermined period of time, to purchase products or services from a specific merchant or a merchant type (i.e., a category of merchants). In specific embodiments, as discussed infra., the purchasing analytics application (or some other ancillary application) may be configured to provide a ranked listing of the spending trends, such that, the most significant spending trend is listed first, followed by the next most significant and so on. The most significant spending trend being defined as the spending trend which would most likely trigger a purchase or a positive response to an advertisement (i.e., the customer is likely to activate a link associated with an electronic advertisement to access the merchant's website associated with the advertisement). In addition, when a spending trend is tied to a product/service type, a merchant or a merchant type, the purchasing analytics application 14 may further identify specific products or services purchased within the trend.

In further specific embodiments of the invention, the analytical purchasing data may include a spending category. A spending category may be one of a plurality of spending categories defined by the financial institution and/or the merchants/advertisers. Based on spending preferences a customer may be assigned to one of the spending categories. In specific embodiments of the invention, the spending categories may be associated with the amount and/or volume of purchases that a customer makes over a predetermined period of time. In other embodiments of the invention, the spending categories or sub-categories may be associated with specific products or services preferred by the customer, specific product or service type preferred by the customer, specific merchants preferred by the customer and/or specific merchant types preferred by the customer.

In addition, the purchasing analytics application 14 may be configured to identify, based on transaction records, future events associated with the customer (for example, a future trip/travel, future wedding, future house purchase, future graduation and the like) and a corresponding date or period of time associated with the future event (i.e., a travel period, a wedding date, a graduation date or the like).

Referring to FIG. 2, a block diagram is presented of a system 200 for anonymously providing purchasing analytics associated with customer to a website while the customer is accessing the website, in accordance with embodiments of the present invention. The system 200 includes financial institution computing environment 10 (shown in FIG. 1) which includes network device 12 that executes purchasing analytics application 14 that is configured to access financial institution transaction databases (not shown in FIG. 2) storing transaction records associated with financial institution customers to determine, based on the transaction records, analytical purchasing data 38 for customers.

In addition, system 200 includes network device 46 that is associated with a website or application requiring customer authentication 48, such as a financial institution website/online banking website, a mobile banking application or the like. It should be noted that the website or application may be a third-party website or application that is requiring the customer to authenticate themselves (provide username and password/PIN or the like) as a financial institution customer. In response to the customer authenticating themselves as a financial institution customer, the network device 46 executes cookie initiator application 44 that is configured to initiate generation of an anonymous cookie 64 that is configured to identify the analytical purchasing data 40.

In specific embodiments of the invention, the cookie initiator application 44 will generate or receive or receive a unique identifier 66 (number, string of characters or the like) that is associated with the customer and, in some embodiments, the analytical purchasing data 38. Once generated, the cookie initiator application 44 communicates the unique identifier 66 and a cookie request, via a communication network 42, such as the internet, a cellular network or the like, to computing device 50 from which the customer is using to access the website or application requiring customer authentication 48. The computing device may comprise a personal computer 52, a mobile communication device/ smart telephone 54, a laptop computer 56 or any other device having network connectivity and computing capabilities. In specific embodiments of the invention, the cookie initiator application 44 generates the unique identifier 66, while in other embodiments the unique identifier 66 is requested by the cookie initiator application 44 and received from the financial institution computing environment 10. In those embodiments in which the cookie initiator application 44 generates the unique identifier 66, the unique identifier 66 is additionally communicated back to the financial institution computing environment 10 for the purpose of associating the unique identifier with the customer and the analytical purchasing data 38.

A web browser application 58 executing on computing device 50 receives the unique identifier 66 and the cookie request and executes cookie generator 60 to generate an anonymous cookie 64 that includes the unique identifier 66 and is stored in the web browser cache 62. The cookie 64 is deemed to be anonymous because the cookie does include or identify the customer, the cookie only identifies through use of the identifier analytical purchasing data 38 associated with the customer.

In addition, system 200 includes network device 70, which comprises a web server associated with a website. In specific embodiments the website displays circular advertisements 76. Circular advertising provides for banners and the like configured about the websites pages that display different advertisements to a user and, in most instances, different advertisements each time a user visits a webpage (e.g., refreshes the browser or the like). The merchant associated with the website may display the advertisements 76, in which case; the advertisements 76 may be associated with products or services sold by the merchant on the website or the advertisements 76 may be associated with other websites. Alternatively, a third-party advertiser (a separate entity from the merchant associated with the website) may provide the advertisements 76 on the website.

In specific embodiments of the invention, network device 70 executes targeted advertisement serving application 72. Targeted advertisement serving application 72 is configured to, in response to the customer using the computing device 50 to access the website associated with network device 70 (i.e., the website that displays the advertisements 76), retrieve or otherwise receive the anonymous cookie 64. In specific embodiments of the invention, the unique identifier 66 in the anonymous cookie 64 prompts a call-back to a network device 78 in the financial institution computing environment 10, which, in turn, executes unique code correlator 68 to determine the customer associated with the unique identifier. Once the customer has been identified, the analytical purchasing data 38 associated with the customer is retrieved from a customer profile database or the like and communicated back to the targeted advertising serving application 72 executing on network device 70. The targeted advertising serving application 72 uses the analytical purchasing data 38 to determine which of the advertisements to currently display to the customer while the customer is accessing the website. In other words, the advertisements that are displayed to the customer are user-specific advertisements, specially tailored for the customer, based on the advertisements 72 meeting matching criteria associated with the analytical purchasing data 38. In other embodiments of the invention, the analytical purchasing data 38 may be provided to the website associated with web server 70 and compiled with data associated with the customer's web session for subsequent analytical processing by the website provider or a third-party entity.

It should be noted that according to specific embodiments of the invention, the merchant operating the website will be affiliated or otherwise in a relationship with the financial institution. As such only affiliated merchants are able to identify the analytical purchasing data 38 associated with the customer and, as such, in specific embodiments, only affiliated merchants can provide the customer targeted advertisements that correspond to the analytical purchasing data 38. In specific embodiments of the invention, only affiliated merchants can read or otherwise comprehend the unique identifier 66 and, as such, only affiliated merchants can make the call-back to the financial institution network device 78. In other specific embodiments, the network device 74 may implement a merchant/advertiser authenticator 74 that is configured to authenticate the merchant/advertiser as an affiliated merchant/authenticate before the network device 78 responds to the call-back (i.e., communicates the analytical purchasing data 38 back to the targeted adverting serving application 72). By implementing the merchant/advertiser authenticator 74 at the network device 78, non-affiliated merchants who may otherwise, accidentally or nefariously, read the unique code and initiate the call-back are prevented from obtaining the analytical purchasing data 38.

Referring to FIG. 3 a block diagram is presented of an apparatus 100, which is configured for providing purchasing analytics associated with customer to a website while the customer is accessing the website, in accordance with embodiments of the present invention. The apparatus 100, which may comprise more than one device, includes a computing platform 102 having a memory 104 and at least one processor 106 in communication with the memory 104. The memory 104 of apparatus 100 stores purchasing analytics application 14 that is configured to access financial institution databases that store transaction records 110 associated with financial institution customers 108 and, based on the transaction records 110 determine analytical purchasing data 38 for each of the customers. Analytical purchasing data 38 may be determined by the financial institution on a regularly scheduled basis or they may be determined on-demand or dynamically (as transactions occur). Once determined, analytical purchasing data 38 may be stored in a customer profile.

Analytical purchasing data 38 may include date/time purchase trends (e.g., times of the week, month or year that the customer prefers to make purchases and/or times within a day that the customer prefers to make purchases). Additionally, the analytical purchasing data 38 may include the customer's preference for electronic purchases versus physical (brick and mortar) purchases (e.g., percentage of overall spend at electronic merchants versus brick and mortar merchants and/or amount of spend at electronic merchants versus physical location merchants. In addition, the analytical purchasing data 38 may include the rate (amount over predetermined time) of purchase at a specific merchant or type of merchant and or the percentage spend a specific merchant in comparison to the customer's overall spend or spend within a merchant type category. Additionally, purchasing analytics application may be configured to determine any other analytical purchasing data that may be instrumental to a website in determining what advertisements to display or for any other purpose.

As previously noted, analytical purchasing data 38 may include a spending trend, which is defined as a customer's preference, over time, to purchase a specific product or service or a specific type of product or service. Alternatively, a spending trend may be defined as a customer's preference, over time, to purchase products or services from a specific merchant or from a specific type of merchant. In specific embodiments a spending trend may be identified based on the customer making a predetermined number of purchases for a specific product/service, a specific type of product/service, a specific merchant or a specific type of merchant over a predetermined period of time (e.g., a month, a year or the like). Additionally, as previously noted, analytical purchasing data 38 may include a spending category may be defined as one of a plurality of categories defined by the financial institution that identify the type of customer in terms of the customer's spend preferences. The different categories may be based on the types of products or services purchased by the customer and/or the amount or volume of transactions conducted by the customer or the like.

The memory 104 of apparatus 100 additionally includes cookie initiator application 44. In response to the customer logging in or otherwise authenticating 112 themselves at a website 114 or a mobile application (i.e., mobile app) 116 associated with financial institution (i.e., verifying that they are a financial institution customer), the cookie initiator application 100 will generate an anonymous cookie 64 that is configured to identify the analytical purchasing data 38. In specific embodiment of the invention, the cookie initiator application is configured to generate or receive a unique identifier 66 that is associated with the customer 108 and, in some embodiments, the analytical purchasing data 38. The unique identifier 66 will be included in instructions to generate a cookie, which are communicated to the web browser application 58 executing on the customer's computing device 50 (i.e., the mobile communication device, PC, laptop or the like from the customer is logging into the website/mobile app). In turn, the web browser application 58 generates an anonymous cookie 64 (i.e., does not identify the customer) that includes the unique identifier and stores the anonymous cookie 64 in the web browser cache 62.

The website 114 may be a financial institution website, such as an online banking website or the like or the website 114 may be a third-party website that is otherwise affiliated with the financial institution (e.g., a website that requires the user to verify themselves as a financial institution customer 108 in order to make purchases and/or receive offers). The mobile application 116 may be mobile banking application or any other mobile application that is otherwise affiliated with the financial institution. Customer authentication may require that the user/customer input a username and/or password/PIN as a means of financial institution customer authentication.

In specific embodiments, the cookie initiator application 44 may generate the unique identifier 66, in which case, once generated the cookie initiator application 44 will communicate the unique identifier to the financial institution so that the financial institution can correlate/match the unique identifier 66 with the customer 108 and/or the customer's analytical purchasing data 38. In other embodiments of the invention, the cookie initiator application 44 may be configured to call-back to the financial institution to request that the financial institution generate the unique identifier 66, which is then subsequently communicated back to the cookie initiator application 44.

Subsequently, in response to the customer using the device (on which the cookie resides) to access a website (or mobile app) that displays electronic advertisements (i.e., a website (or mobile app) different from the website that generated/dropped the cookie on the device), the anonymous cookie 64 is retrieved from the web browser cache 62 and provides for identification of the analytical purchasing data 38. In specific embodiments of the invention, the unique identifier 66 in the cookie 64 prompts a call-back to a financial institution server, which includes the unique identifier 66. In response to the call-back, the financial institution server correlates the unique identifier 66 to the customer 108, and, in some embodiments, the analytical purchasing data 38, retrieves the analytical purchasing data 38 from a financial institution database (e.g., customer profile database or the like) and communicates the analytical purchasing data 38 back to the website (or mobile app). In specific embodiments of the invention, once the website has been provided the analytical purchasing data 38, the website/mobile app determines which electronic advertisements to display to the customer during the customer's current website session based on the customer's analytical purchasing data 38. In this regard, attributes (e.g., metadata) associated with the analytical purchasing data 38 are matched with attributes (e.g., metadata) associated the advertisements to determine which advertisements match or align with the customer's analytical purchasing data 38.

Referring to FIG. 4 a block diagram is presented of an apparatus 100, which is configured for determining analytical purchasing data, in accordance with embodiments of the present invention. In addition to providing greater detail, FIG. 4 highlights various alternate embodiments of the invention. The apparatus 100 may include one or more of any type of computing device, such as multiple servers or the like. The present apparatus and methods can accordingly be performed on any form of one or more computing devices.

The apparatus 100 includes computing platform 102 that can receive and execute algorithms, such as routines, and applications. Computing platform 102 includes memory 104, which may comprise volatile and non-volatile memory, such as read-only and/or random-access memory (RAM and ROM), EPROM, EEPROM, flash cards, or any memory common to computer platforms. Further, memory 104 may include one or more flash memory cells, or may be any secondary or tertiary storage device, such as magnetic media, optical media, tape, or soft or hard disk. Moreover, memory 104 may comprise cloud storage, such as provided by a cloud storage service and/or a cloud connection service.

Further, computing platform 102 also includes processor 106, which may be an application-specific integrated circuit ("ASIC"), or other chipset, processor, logic circuit, or other data processing device. Processor 106 or other processor such as ASIC may execute an application programming interface ("API") (not shown in FIG. 4) that interfaces with any resident programs, such as purchasing analytics application 14, and routines, sub-modules associated therewith or the like stored in the memory 104 of the apparatus 100.

Processor 106 includes various processing subsystems (not shown in FIG. 4) embodied in hardware, firmware, software, and combinations thereof, that enable the functionality of apparatus 100 and the operability of the apparatus on a network. For example, processing subsystems allow for initiating and maintaining communications and exchanging data with other networked devices. For the disclosed aspects, processing subsystems of processor 106 may include any subsystem used in conjunction with purchasing analytics application 14 and related algorithms, sub-algorithms, modules, sub-modules thereof.

Computer platform 102 may additionally include communications module (not shown in FIG. 4) embodied in hardware, firmware, software, and combinations thereof, that enables communications among the various components of the apparatus 100, as well as between the other networked devices. Thus, communication module may include the requisite hardware, firmware, software and/or combinations thereof for establishing and maintaining a network communication connection.

The memory 104 of apparatus 100 stores purchasing analytics application 14 that is configured to provide targeted advertisements through implementation of anonymous cookies that, without identifying the customer, identify spending trends, spending categories or other spending data associated with the customer, in accordance with embodiments of the present invention. In this regard, spending trend analysis application is configured to access financial institution transaction databases 16, such as POS merchant transaction databases, customer account transaction databases and the like, which store transaction records 110 associated with customers 108 of the financial institution and determine, based on the transaction records, analytical purchasing data 38 associated with the customers 108.

As previously discussed the analytical purchasing data 38 may include determine date/time purchase trends 120 (e.g., times of the week, month or year that the customer prefers to make purchases and/or times within a day that the customer prefers to make purchases). Additionally, the analytical purchasing data 38 may include the customer's preference for electronic purchases versus physical (brick and mortar) purchases 122 (e.g., percentage of overall spend at electronic merchants versus brick and mortar merchants). In addition, the electronic versus physical purchase preference can be configured to be broken down on a specific product/service basis, a specific type of product service basis, a specific merchant basis, a specific type of merchant basis or the like. In addition, the analytical purchasing data 38 may include the rate (amount over predetermined time) of purchase at a specific merchant or type of merchant 124 and or the percentage spend a specific merchant in comparison to the customer's overall spend or spend within a merchant type category. Additionally, analytical purchasing data 38 may include any other purchase/spend-related analytical data 126 that may be instrumental to a website in determining what advertisements to display or instrumental for any other purposes (e.g., website usage analysis).

As previously described, the analytical purchasing data 38 may include spending trends 134 which may be configured by the financial institution and/or customer to indicate a customer's preference, over a predetermined time period, to purchase a specific product or service 136 or a preference to purchase a product or service type 138 (i.e., a category of products or services). Additionally, a spending trend may indicate a customer's preference, over a predetermined period of time, to purchase products or services from a specific merchant 140 or a merchant type 142 (i.e., a category of merchants).

In specific embodiments, analytical purchasing data 38 may include a ranked listing 144 of the spending trends 134, such that, the most significant spending trend is listed first, followed by the next most significant and so on. The most significant spending trend being defined as the spending trend which would most likely trigger a purchase or a positive response to an advertisement (i.e., the customer is likely to activate a link associated with an electronic advertisement to access the merchant's website associated with the advertisement). In such embodiments of the invention, in which the anonymous cookie (64 of FIGS. 2 and 3) serves to identify a ranked listing 130 of spending trends, the targeted advertising serving application (72 of FIG. 2) is configured to look first for advertisements that match the attributes of the first listed spending trend and, if no advertisements match, then look for an attribute match between available advertisements and the next listed spending trend and, so on, until a match is found between attributes of a listed spending trend and the advertisements. Additionally, if the website is configured to display more than one advertisement, either in different locations or on a rotating basis, the targeted advertisement application is configured to similarly look for advertisements that meet attributes of the first listed spending trend, followed by the next listed spending trend and, so on.

The analytical purchasing data 38 may include a spending category 128, which is one of a plurality of spending categories defined/configured by the financial institution and/or the merchants/advertisers. Based on spending preferences a customer may be assigned to one of the spending categories. In specific embodiments of the invention, the spending categories may be associated with the amount and/or volume of purchases that a customer makes over a predetermined period of time. In other embodiments of the invention, the spending categories or sub-categories may be associated with specific products or services preferred by the customer, specific product or service type preferred by the customer, specific merchants preferred by the customer and/or specific merchant types preferred by the customer.

In additional embodiments of the invention, the purchasing analytics application 14 is configured to identify, based on transaction records, future events 130 associated with the customer (for example, a future trip/travel, future wedding, future house purchase, future graduation and the like) and a corresponding date 132 or period of time associated with the future event (i.e., a travel period, a wedding date, a graduation date or the like). In such embodiments of the invention, in which the anonymous cookie (64 of FIGS. 2 and 3) serves to identify the future event(s) 130 and associated date/time period 132, the targeted advertising serving application (72 of FIG. 2) is configured to look for advertisements that match the attributes of the future event and to display the advertisements either during the time period or for a predetermined period of time prior to the date or the start of the time period. Additionally, in specific embodiments of the invention, in which the anonymous cookie serves to identify the future event 130 and associated date/time period 132, the anonymous cookie 64 may be configured to expire on a predetermined date (e.g., after completion of the time period or once the date of the event arrives), such that the cookie is automatically deleted from web browser cache at a specified date and/or time.

In further embodiments of the invention, the purchasing analytics application 14 is configured to tie or otherwise associate specific products or services 132 purchased with a trend, such as a merchant trend, merchant type trend or a product/service type trend. In such embodiments of the invention, in which the anonymous cookie (64 of FIGS. 2 and 3) serves to identify the specific product(s)/service(s) 146 within a trend, the targeted advertising serving application (72 of FIG. 2) is configured to ignore advertisements that are for the same product or service (e.g., the customer recently purchased a gas grill, so gas grill advertisements will not be displayed). However, the targeted advertising serving application 72 may be configured to look for attribute matches between the advertisements and products or services that are associated with (related to but not the same) the specific product or service (e.g., the customer recently purchases a gas grill, so gas grill accessories advertisements should be displayed to the customer).

Thus, systems, apparatus, methods, and computer program products described above provide for anonymously providing purchasing analytics associated with customer to a website while the customer is accessing the website. Specifically, a financial institution, having access to a customer's transactional data, can analyze the data to determine analytical purchasing data. Once the customer authenticates (e.g., logs-in or the like) themselves at a financial institution website (e.g., online banking), a networked application (e.g., mobile banking) or any other website or application affiliated with the financial institution, an anonymous cookie that is configured to identify the analytical purchasing data is generated and stored in the web browser cache. In response to the customer using the device to access a website that displays advertisements, the anonymous cookie is retrieved from the web browser cache and the analytical purchasing data is provided to the website. In specific embodiments of the invention, the website uses the analytical purchasing data of the customer to determine which of the plurality of advertisements are to be displayed to the customer while they visit the website.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for anonymously providing purchasing analytics associated with a user to a website while the user is accessing the website, the system comprising:
    a computing platform including a memory and at least one processor in communication with the memory;
    a purchasing analytics application stored in the memory, executable by one or more of the processors and configured to access one or more financial institution transaction databases storing transaction records associated with the user of a financial institution associated with the transaction databases, and determine, based on the transaction records, analytical purchasing data associated with the user, wherein the transactions records include both online purchases and offline purchases conducted by the user; and
    a cookie initiator application stored in the memory, executable by one or more of processors and configured to, in response to the user identifying themselves at a first website or mobile application as the user of the financial institution, initiate generation of an anonymous cookie that is stored in a web browser cache of a computing device from which the user has accessed the first website or the mobile application, wherein the anonymous cookie includes a user-specific identifier that is configured to identify the analytical purchasing data associated with the user by mapping the identifier to the analytical purchasing data;
    wherein, in response to the user using the computing device to access a second website, (i) the anonymous cookie is retrieved from the web browser cache, (ii) the user-specific identifier in the cookie, prompts a call-back, which includes the user-specific identifier, to a server associated with the financial institution, (iii) in response to correlating the user-specific identifier to the analytical purchasing data at the server, retrieves the analytical purchasing data, and (iv) communicates the analytical purchasing data to the second website.

2. The apparatus of claim 1, wherein (i) the purchasing analytics application is further configured to determine, based on the transaction data, at least one of a date purchasing trends or time purchasing trends associated with the user, and (ii) the cookie initiator application initiates generation of the anonymous cookie that is configured to identify the date purchasing trends and the time purchasing trends associated with the user.

3. The apparatus of claim 2, wherein the purchasing analytics application is further configured to determine, based on the transaction data, at least one of the date purchasing trends or the time purchasing trends associated with the user, and wherein the date and time purchasing trends are further defined as being one of product or service specific, type of product or service specific, merchant specific, or type of merchant specific.

4. The apparatus of claim 1, wherein (i) the purchasing analytics application is further configured to determine, based on the transaction data, at least one of an amount or a percentage purchased electronically and purchased at a physical location associated with the user, and (ii) the cookie initiator application initiates generation of the anonymous cookie that is configured to identify the amount or a percentage purchased electronically and purchased at a physical location.

5. The apparatus of claim 2, wherein the purchasing analytics application is further configured to determine, based on the transaction data, at least one of the amount or the percentage purchased electronically and purchased at the physical location, and wherein the amount and the percentage are further defined as being one of product or service specific, type of product or service specific, merchant specific, or type of merchant specific.

6. The apparatus of claim 1, wherein the (i) the purchasing analytics application is further configured to determine, based on the transaction data, at least one of an amount or a percentage purchased at a specified merchant in comparison to at least one of an overall purchase amount for the user or a purchase amount for a merchant type by the user, and (ii) the cookie initiator application initiates generation of the anonymous cookie that is configured to identify the amount or the percentage purchased at the specified merchant in comparison to at least one of the overall purchase amount of the user or the purchase amount for a merchant type by the user.

7. The apparatus of claim 1, wherein, in response to the user using the device to access the second website, at least one of (i) the anonymous cookie being retrieved from the web browser cache, (ii) the call-back to the financial institution server or (iii) retrieving the analytical purchasing data and communicating the analytical purchasing date to the second website, is based on the website being affiliated with the financial institution.

8. The apparatus of claim 1, wherein, in response to the user using the device to access the second website that displays advertising, the anonymous cookie is retrieved from the web browser cache and the analytical purchasing data is provided to the website, and wherein the second website uses the analytical purchasing data to determine one or more advertisements to currently display to the user while accessing the second website.

9. The apparatus of claim 1, wherein, in response to the user using the device to access the second website, the anonymous cookie is retrieved from the web browser cache and the analytical purchasing data is provided to the website, and wherein the second website compiles the analytical purchasing data and data associated with the website session of the user.

10. A system for anonymously providing purchasing analytics associated with a user to a website while the user is accessing the website, the system comprising:
    a user computing device having a first memory and at least one first processor in communication with the memory;
    a first computing platform including a second memory and at least one second processor in communication with the second memory;
    a purchasing analytics application stored in the second memory, executable by one or more of the second processors and configured to access one or more financial institution transaction databases storing transaction records associated with the user of a financial institution associated with the transaction databases, and determine, based on the transaction records, analytical purchasing data associated with the user, wherein the transactions records include both online purchases and offline purchases conducted by the user;

a web browser application stored in the first memory, executable by one or more of first processors and configured to, in response to the user authenticating themselves at a first website or mobile application as the user of the financial institution, generate an anonymous cookie includes a user-specific identifier that is configured to identify the analytical purchasing data associated with the user by mapping the identifier to the analytical purchasing data, and store the anonymous cookie in a web browser cache, wherein, in response to the user using the computing device to access a second website, (i) the anonymous cookie is retrieved from the web browser cache, (ii) the user-specific identifier in the cookie, prompts a call-back, which includes the user-specific identifier, to a server associated with the financial institution, (iii) in response to correlating the user-specific identifier to the analytical purchasing data at the server, retrieves the analytical purchasing data, and (iv) communicates the analytical purchasing data is provided to the second website.

11. The system of claim 10, wherein (i) the purchasing analytics application is further configured to determine, based on the transaction data, at least one of (1) a date purchasing trends, (2) time purchasing trends or (3) an amount or a percentage purchased electronically and purchased at a physical location, associated with the user, and (ii) the web browser application is further configured to initiate generation of the anonymous cookie that is configured to identify the date purchasing trends and the time purchasing trends and the amount or the percentage purchased electronically and purchased at the physical location associated with the user.

12. The system of claim 11, wherein the purchasing analytics application is further configured to determine, based on the transaction data, at least one of (1) the date purchasing trends, (2) the time purchasing trends or (3) the amount or the percentage purchased electronically and purchased at a physical location associated with the user, and wherein the date and time purchasing trends and the amount or the percentage purchased electronically and purchased at a physical location are further defined as being one of product or service specific, type of product or service specific, merchant specific, or type of merchant specific.

13. The system of claim 10, wherein, in response to the user using the device to access the second website, at least one of (i) the anonymous cookie being retrieved from the web browser cache, (ii) the call-back to the financial institution server or (iii) retrieving the analytical purchasing data and communicating the analytical purchasing date to the second website, is based on the website being affiliated with the financial institution.

14. The system of claim 10, further comprising:
a second computing platform including a third memory and at least one third processor in communication with the third processor;

a targeted advertisement serving application stored in the third memory, executable by the third processor and configured to, in response to (i) the user using the computing device to access a second website, (ii) retrieving the anonymous cookie from the web browser cache and (iii) providing the analytical purchasing data to the website, determine, based on the analytical purchasing data, which of one or more advertisements to currently display to the user while accessing the second website.

15. A computer program product comprising:
a non-transitory computer-readable medium comprising:
a first set of codes for causing a computer to access one or more financial institution transaction databases storing transaction records associated with a user of a financial institution associated with the transaction databases to determine, based on the transaction records, analytical purchasing data associated with the user, wherein the transactions records include both online purchases and offline purchases conducted by the user;

a second set of codes for causing a computer to, in response to the user identifying themselves at a first website or mobile application as the user of the financial institution, initiate generation of an anonymous cookie on a computing device from which the user has accessed the first website or the mobile application, wherein the anonymous cookie includes a user-specific identifier that is configured to identify the analytics purchasing data associated with the user by mapping the identifier to the analytical purchasing data; and a third set of codes for causing a computer to, in response to the user using the computing device to access a second website (i) retrieve the anonymous cookie from the web browser cache, (ii) prompt a call-back which includes the user-specific identifier, to a server associated with the financial institution, (iii) in response to correlating the user-specific identifier to the analytical purchasing data at the server, retrieve the analytical purchasing data, and (iv) communicate the analytical purchasing data to the second website.

16. The computer program product of claim 15, wherein the first set of codes is further configured for causing the computer to determine, based on the transaction data, at least one of (1) a date purchasing trends, (2) time purchasing trends or (3) an amount or a percentage purchased electronically and purchased at a physical location, associated with the user, and the second set of codes is further configured for causing the computer to initiate generation of the anonymous cookie that is configured to identify the date purchasing trends and the time purchasing trends and the amount or the percentage purchased electronically and purchased at the physical location associated with the user.

* * * * *